United States Patent [19]
Vincent

[11] Patent Number: 5,113,827
[45] Date of Patent: May 19, 1992

[54] PROGRAMMED SPARK SCATTER FOR IDLE SPEED CONTROL

[75] Inventor: Michael T. Vincent, Sterling, Mass.

[73] Assignee: Chrysler Corporation, Highland Park, Mich.

[21] Appl. No.: 523,451

[22] Filed: May 14, 1990

[51] Int. Cl.⁵ .............................................. F02P 5/00
[52] U.S. Cl. ................................... 123/417; 123/339
[58] Field of Search ............... 123/339, 418, 406, 415, 123/416, 417

[56] References Cited

U.S. PATENT DOCUMENTS

| | | | |
|---|---|---|---|
| 4,143,633 | 3/1979 | Peck | 123/146.5 A |
| 4,244,339 | 1/1981 | Gorille | 123/416 |
| 4,446,832 | 5/1984 | Matsumura et al. | 123/339 |
| 4,506,639 | 3/1985 | Murakami et al. | 123/339 |
| 4,554,900 | 11/1985 | Komoda | 123/418 |
| 4,559,915 | 12/1985 | Naganawa et al. | 123/406 |
| 4,602,603 | 7/1986 | Honkanen et al. | 123/418 |
| 4,696,272 | 9/1987 | Kato et al. | 123/339 |
| 4,719,573 | 1/1988 | Kissel et al. | 123/417 |
| 4,821,701 | 4/1989 | Nankee, II et al. | 123/520 |
| 4,942,860 | 7/1990 | Chujo et al. | 123/417 |

Primary Examiner—E. Rollins Cross
Attorney, Agent, or Firm—Mark P. Calcaterra

[57] ABSTRACT

In an idle speed control system for an engine of an automotive vehicle, a method of controlling the idle speed within an engine speed envelope of acceptable values by inversely varying the spark advance setting with respect to the closed loop fuel control system modulations.

4 Claims, 5 Drawing Sheets

PROGRAMMED SPARK SCATTER FOR IDLE SPEED CONTROL

BACKGROUND OF THE INVENTION

1. Field of the Invention

The present invention relates generally to the spark stabilization for an engine of an automotive vehicle, and more particularly, to a programmed spark scatter for fuel/air ratio changes at constant air flow levels in the engine idling condition.

2. Description of Related Art

U.S. Pat. No. 4,506,639 to Murakami, et al, discloses a method for controlling the idle speed of an internal combustion engine with variable ignition timing.

U.S. Pat. No. 4,719,573 to Kissel, et al, illustrates a programmed spark scatter control method for quick response to changing load conditions on an internal combustion engine, the disclosure of which is hereby incorporated by reference.

Typically, two-group fuel injection is a method of fuel injection where fuel injectors are fired in groups (e.g., two at a time) to fuel cylinders of an engine as opposed to sequential fuel injector firing (e.g., one at a time). As a result, a need exists for a programmed spark scatter routine for idle speed control of the engine.

SUMMARY OF THE INVENTION

The present invention is a method of spark advance control having computation means and means for monitoring and storing various engine parameters such as engine temperature, engine revolutions per minute (RPM), and engine manifold absolute pressure (MAP) and means for firing the spark to the appropriate cylinder. The method includes the steps of calculating a spark advance setting based on the various engine parameters, determining whether spark scatter is needed based on the calculated spark advance setting, and firing the spark to the appropriate engine cylinder based on the calculated spark advance setting if spark scatter is not needed. The method also includes computing a speed error setting by subtracting a calculated ideal engine idle RPM from the actual engine RPM and comparing the computed speed error setting with a deadband envelope of previously determined speed error settings. The method further includes calculating a delta spark advance based on the computed speed error setting if the computed speed error setting is greater than the deadband envelope, revising the spark advance by adding the speed error to the delta spark advance, and firing the spark to the appropriate engine cylinder based on the revised spark advance setting.

One advantage of the present invention is that in a typical case of the idle neutral condition, one can discern the feed forward spark wave with the RPM feedback spark superimposed upon it. The idle drive conditions show an almost perfect feed forward wave form with very little RPM feedback spark applied. Another advantage of the present invention is that a significant improvement in idle quality can be achieved by providing for a spark stabilization algorithm that permits spark compensation for fuel/air ratio changes at constant airflow levels. This feature is a function of the basic fueling strategy employed to meet the requirements for closed loop fuel control idling with current hardware systems. A further advantage of the present invention is that it is independent of the engine package and can have universal application.

Other objects, features and advantages of the present invention will be readily appreciated as the same becomes better understood from the following description and the accompanying drawings.

DESCRIPTION OF THE PREFERRED EMBODIMENT(S)

The present invention employs a control system including a computational device such as a microprocessor or electronic control unit (ECU) which interfaces with several transducers or sensors which monitor various engine parameters such as the engine temperature (TMP), engine revolutions per minute (RPM), engine manifold absolute pressure (MAP), etc. Examples of such control systems may be found in U.S. Pat. No. 4,821,701 to Nankee, II et al. and U.S. Pat. No. 4,602,603 to Honkanen et al., the disclosure of both patents being incorporated herein by reference. A further example of such a control system may be found in U.S. Pat. No. 4,719,573 to Kissel et al., the disclosure of which is also incorporated herein by reference.

Figure 1:
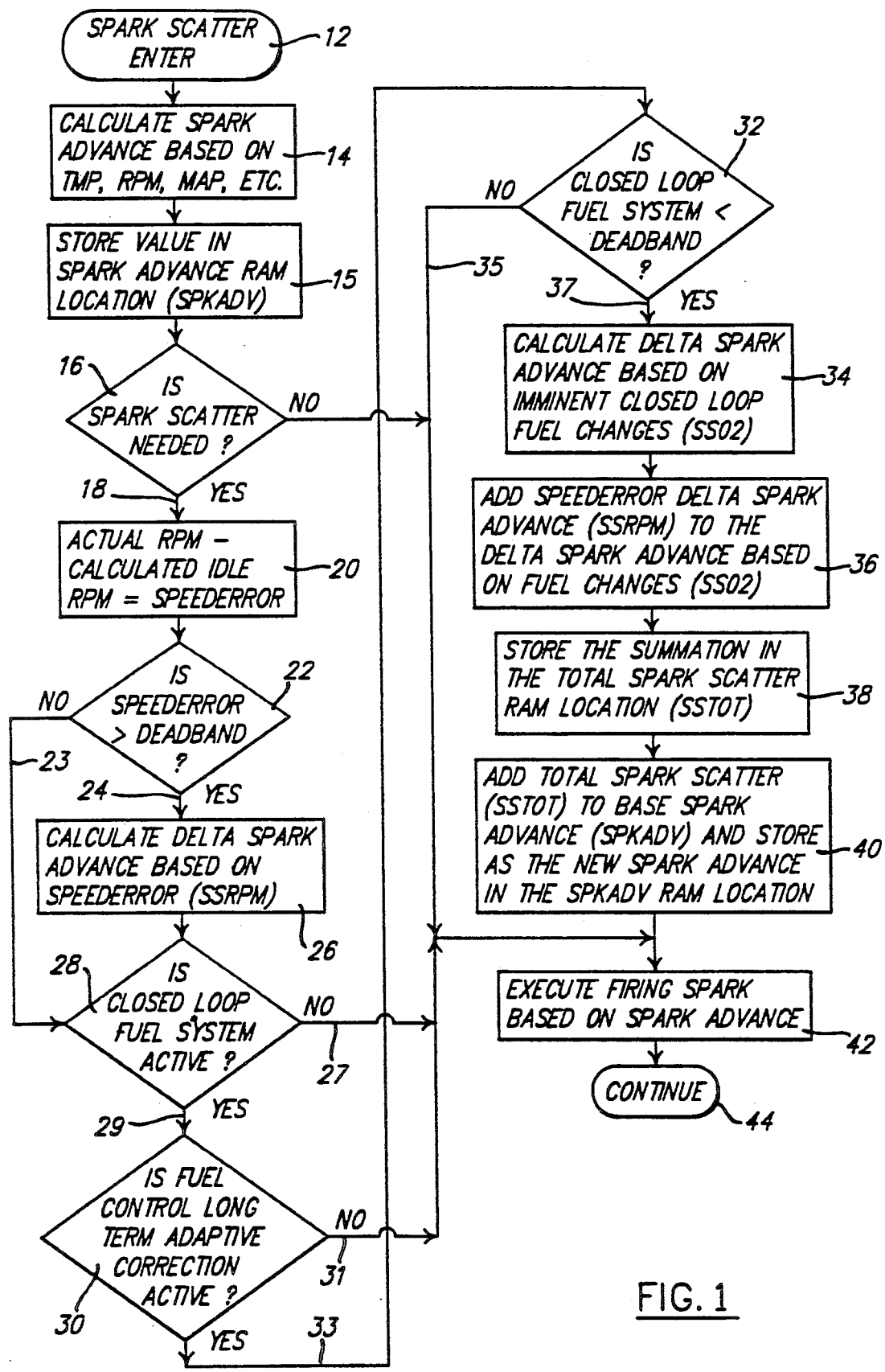
FIG. 1 is a flowchart illustrating the method of idle speed control according to the present invention.

Referring to FIG. 1, the methodology for spark advance control enters through bubble 12 and falls through to block 14. In block 14, the methodology calculates a spark advance based on current engine operating conditions. The values for the calculation are provided by the transducers or sensors monitoring the engine temperature (TMP), the engine speed (RPM), the engine manifold absolute pressure (MAP), etc. The methodology then advances to block 15 where the calculated value of spark advance is stored in the spark advance RAM location (SPKADV). The methodology then proceeds to decision block 16.

At decision block 16, the methodology determines if spark scatter is necessary. If spark scatter is not needed, the methodology then follows path 17 to block 42 where the firing of the spark based on the spark advance, as stored in SPKADV, is executed as calculated. The methodology then advances to bubble 44 and continues.

Returning to decision block 16, if spark scatter is needed, the methodology follows path 18 to block 20. In block 20, the methodology calculates the engine speed error based on the difference between the measured or actual engine RPM and a calculated or target idle RPM. The methodology then proceeds to decision block 22.

At decision block 22, the methodology determines if the speed error is greater than a desired RPM deadband or envelope of acceptable values. If the speed error is not greater than the desired RPM deadband, the methodology follows path 23 to decision block 28 to be described. If the speed error is greater than the desired RPM deadband, the methodology follows path 24 to block 26. In block 26, the methodology calculates a delta spark advance based on the speed error deviation from the deadband of acceptable values. As such, the delta spark advance value can be either positive or negative. The delta spark advance value arrived at in this manner is now stored in the RPM feedback RAM location (SSRPM). The methodology now falls through to decision block 28.

At decision block 28, the methodology determines if the closed loop fuel system is active. If the closed loop fuel system is not active, the methodology follows path 27 to block 42 previously described. If the closed loop fuel system is active, the methodology follows path 29 to decision block 30. At decision block 30, the methodology determines if a fuel control long term adaptive correction is active. If not, the methodology follows path 31 to block 42 previously described.

Returning to decision block 30, if the long term adaptive fuel control is active, the methodology follows path 33 to decision block 32. At decision block 32, the methodology determines if the closed loop fuel system is less than a deadband of acceptable values. If not, the methodology follows path 35 to block 42 previously described. If the closed loop fuel system is less than the deadband of acceptable values, the methodology follows path 37 to block 34.

Figure 2:
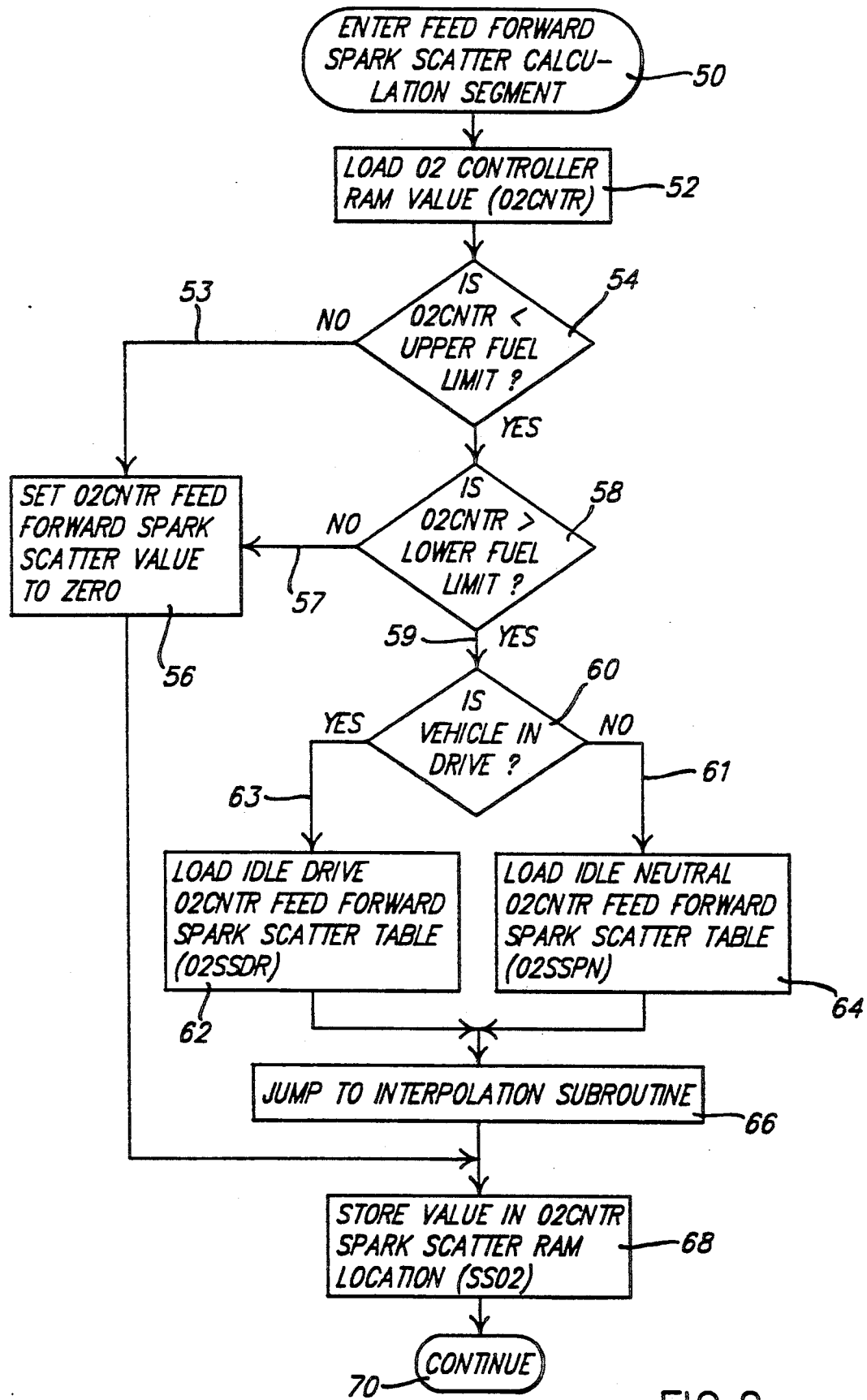
FIG. 2 is a flowchart illustrating the feed forward spark scatter calculation segment of the method of idle speed control of FIG. 1.

In block 34, the methodology calculates a delta spark advance based on the imminent closed loop fuel system deviations from an acceptable value. This calculation is shown in FIG. 2 to be described. As such, the delta spark advance value can be either positive or negative. The delta spark advance value arrived at in this manner is now stored in the fuel control based RAM location (SS02). The methodology now falls through to block 36. In block 36, the methodology adds the speed error based delta spark advance value stored in SSRPM to the fuel control based delta spark advance stored in SS02. The methodology now falls to block 38. In block 38, the methodology stores the summation of the two delta spark advances in the total calculated spark scatter RAM location (SSTOT). The methodology now falls to block 40. In block 40, the methodology adds the total spark scatter value (SSTOT) to the base spark advance value, previously stored in SPKADV, and stores this added value as the new spark advance in the SPKADV RAM location. The methodology now falls to block 42 previously described.

Referring now to FIG. 2, a flowchart of a method for the feed forward spark scatter calculation segment of block 34 of FIG. 1 is shown. The methodology begins in bubble 50 and falls through to block 52.

In block 52, the oxygen (O2) controller RAM value (O2CNTR) is loaded into the ECU accumulator for processing. The methodology advances to decision block 54 where it is determined if the O2CNTR value is less than an upper fuel control limit or maximum acceptable value. If it is not less, the methodology follows path 53 to block 56. In block 56, the methodology sets the O2CNTR feed forward spark scatter value to a predetermined value such as zero. The methodology then falls to block 68 where the O2CNTR spark scatter value is stored in the O2CNTR spark scatter RAM location (SSO2). The methodology then advances to bubble 70 and returns.

Returning to decision block 54, if the O2CNTR value is less than the upper fuel control limit, the methodology follows path 55 to decision block 58. At decision block 58, the methodology determines if the O2CNTR value is greater than a lower fuel control limit or minimum acceptable value. If it is not greater, the methodology follows path 57 to block 56 previously described. If the O2CNTR value is greater than the lower fuel control limit, the methodology follows path 59 to decision block 60. At decision block 60, the methodology determines if the vehicle's transmission is in drive. If the vehicle's transmission is not in drive, the methodology follows path 61 to block 64 to be described.

Returning to decision block 60, if the vehicle's transmission is in drive, the methodology follows path 63 to block 62. In block 62, the methodology loads the idle drive O2CNTR feed forward spark scatter calibration table (O2SSDR) into the ECU pointer. The methodology then falls to block 66 where a jump is executed to a linear interpolation subroutine. The methodology then returns to the point of jump origination with the interpolated value. The methodology then falls to block 68 previously described.

In block 64, the methodology loads the idle neutral O2CNTR feed forward spark scatter calibration table (O2SSPN) into the ECU pointer. The methodology then falls to block 66 where a jump is executed to a linear interpolation subroutine. The methodology then returns to the point of jump origination with the interpolated value. The methodology then falls to block 68 previously described.

Figure 3:
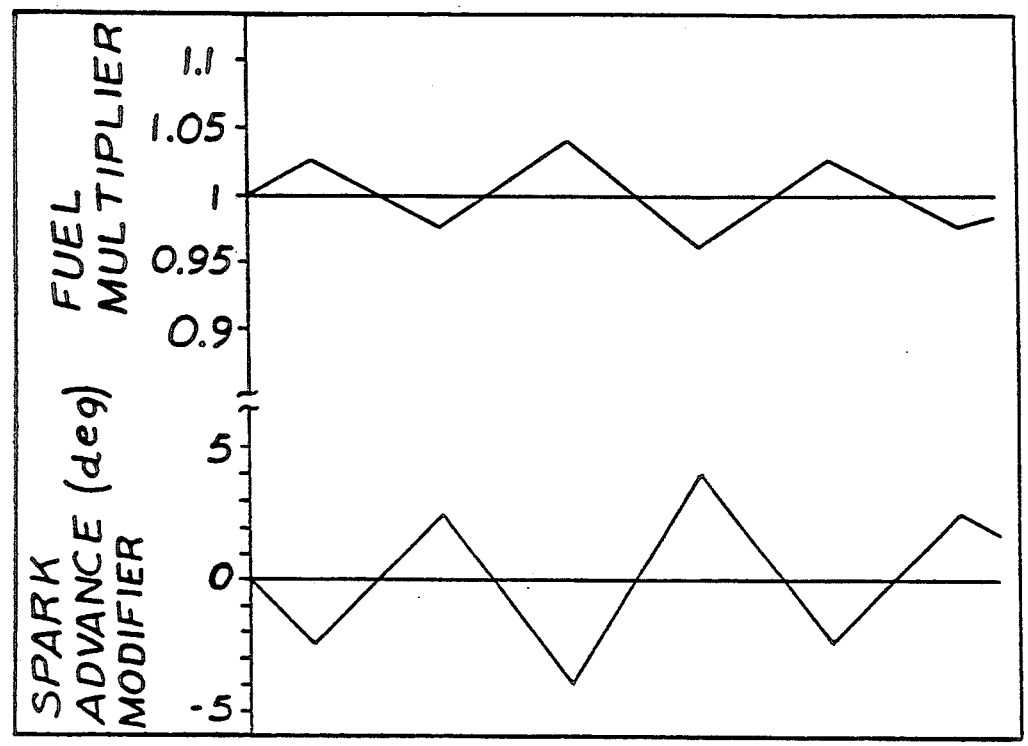
FIG. 3 is a graph illustrating how spark advance and fuel counteract to maintain engine speed.

FIG. 3 is a theoretical graph illustrating how the spark advance and fuel counteract to maintain engine speed. A fuel multiplier may be used to modulate the pulse width (PW) of the fuel injectors to cause the fuel-/air ratio to toggle from slightly rich of the stoichiometric fuel/air ratio to slightly lean and back to rich again. This allows the fuel system to be closed loop at idle using the exhaust gas oxygen sensor as the feedback device. When the fuel/air ratio moves rich of the stoichiometric value the engine speed will predictably increase. Conversely, when the fuel/air ratio moves lean of the stoichiometric value the engine speed will predictably decrease.

The feed forward spark advance modifier is inversely proportional to the modulation of the fuel multiplier. From FIG. 3 it can be seen that, as the fuel multiplier increases, the spark advance is modified in the retard direction (negative). As the fuel multiplier decreases, the spark advance is modified in the advance direction (positive). This inverse modulation of the spark advance relative to the fuel multiplier counteracts the otherwise unchecked engine speed changes resulting from the fuel injector PW modulation.

Figure 4:
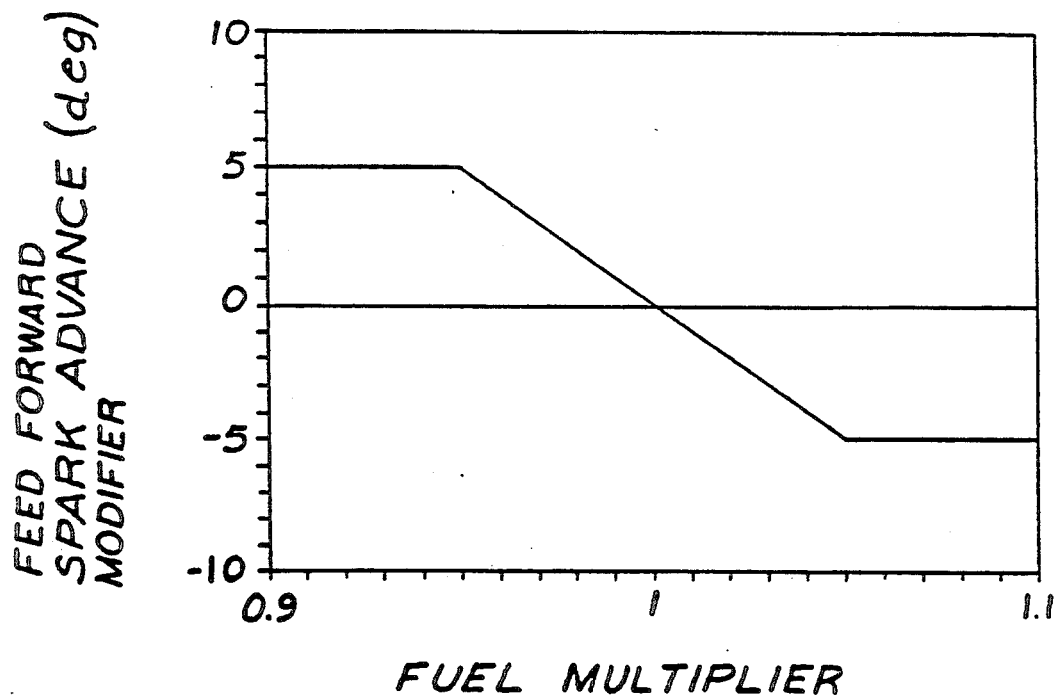
FIG. 4 is a feed forward advance modifier calibration table for spark stabilization based on the fuel multiplier.

FIG. 4 is an example of a feed forward spark advance modifier table where the spark stabilization value is obtained by linear interpolation based on the fuel multiplier input.

Figure 5A:
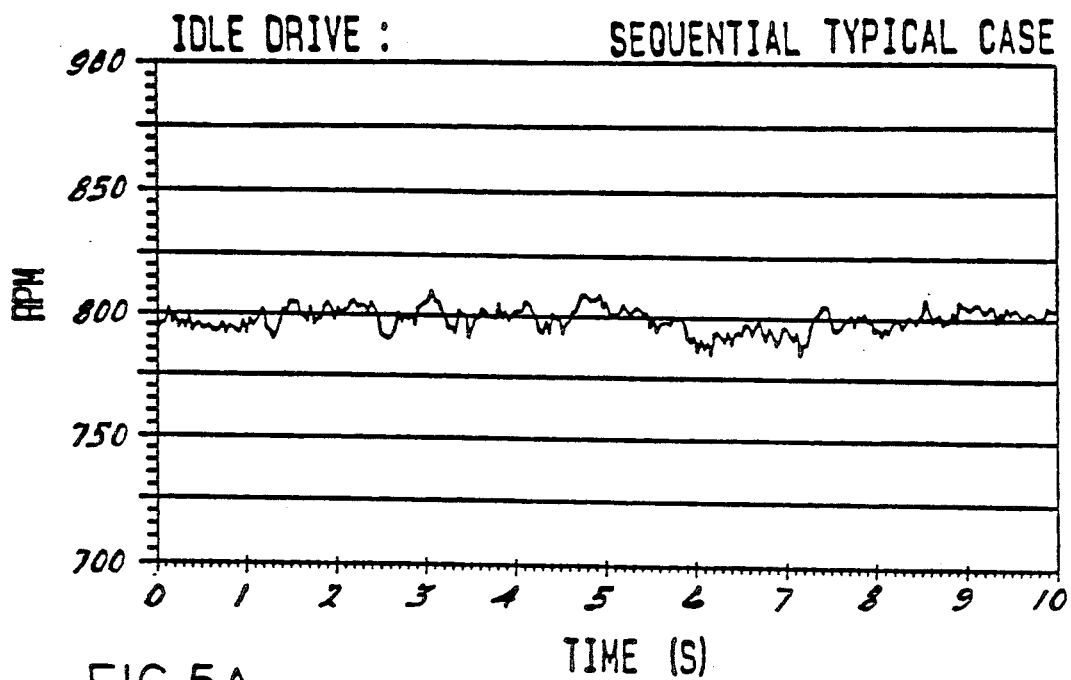
FIG. 5a is a time graph showing the engine speed variations over time in the typical idle drive case involving sequential fuel injector firings.

FIG. 5a is an example of data taken of the engine speed of a sequentially fuel injected engine operating in the idle drive condition.

Figure 5B:
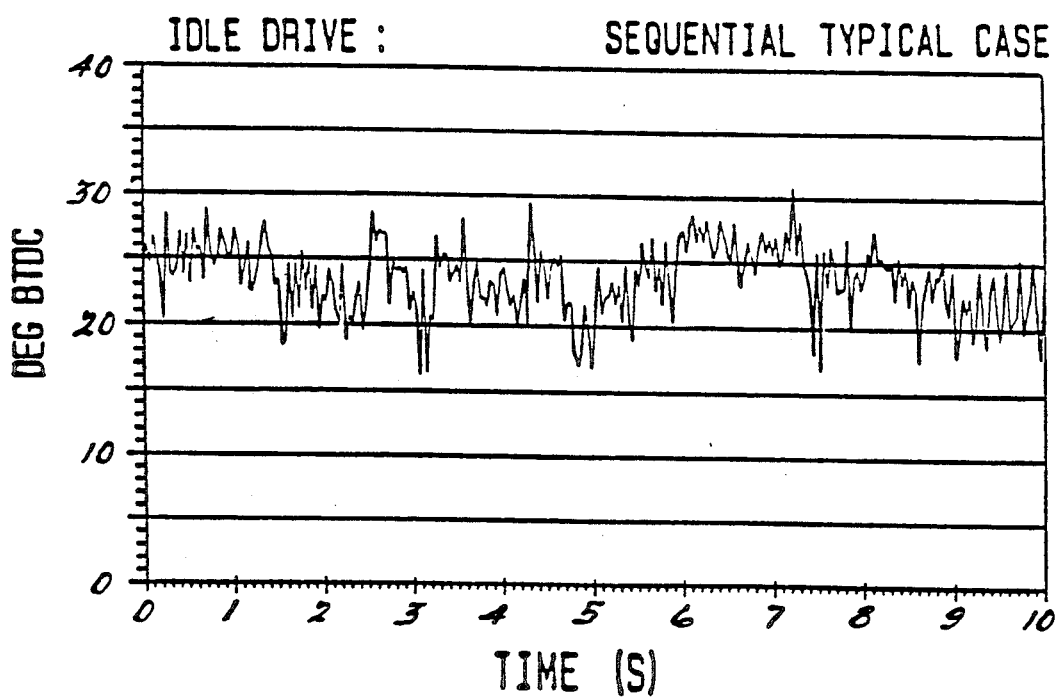
FIG. 5b is a time graph showing the spark advance variations over time in the typical idle drive case involving sequential fuel injector firings.

FIG. 5b is an example of data taken of the spark advance of a sequentially fuel injected engine operating in the idle drive condition. The spark advance values arrived at were dependent solely on the RPM feedback values and devoid of the feed forward spark advance values. From FIG. 5b it can be seen that large spark deviations from the nominal spark advance value may be required to maintain the engine speed near 800 RPM in FIG. 5a.

Figure 6A:
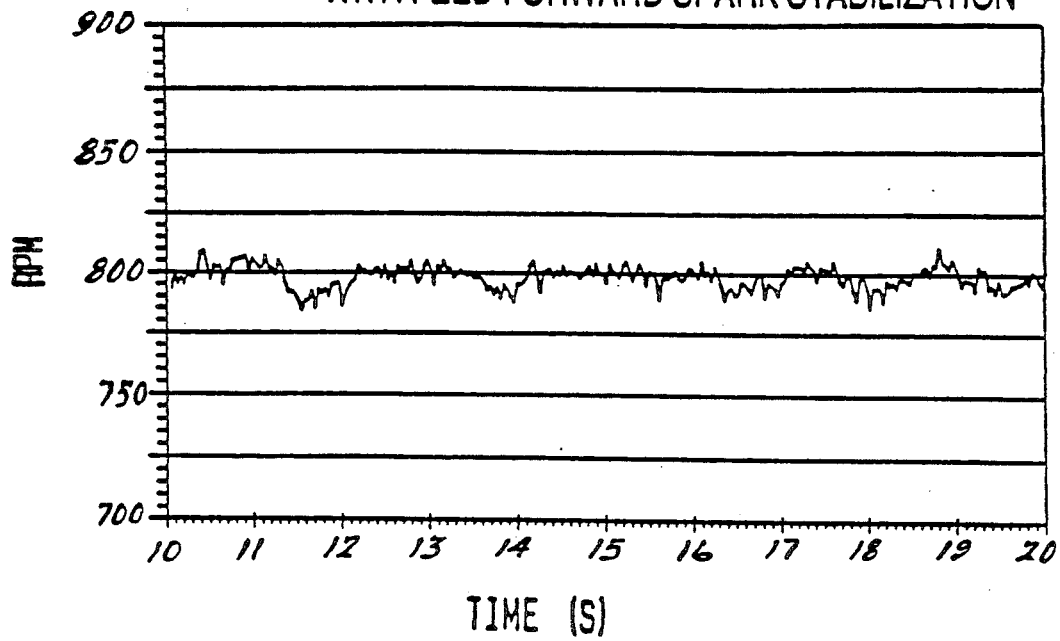
FIG. 6a is a time graph depicting the engine speed variations over time in the typical idle drive case involving sequential fuel injector firings employing the feed forward spark advance calibration.

FIG. 6a is an example of data taken of the engine speed of a sequentially fuel injected engine operating in the idle drive condition with the feed forward spark advance control system feature active.

Figure 6B:
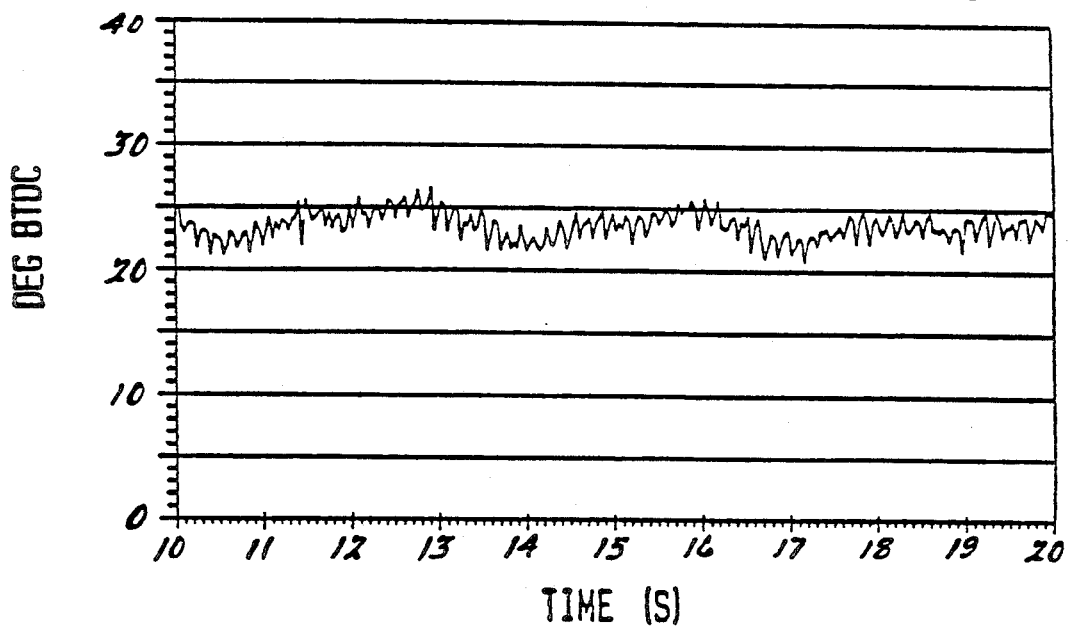
FIG. 6b is a time graph depicting the spark advance variations over time in the typical idle drive case involving sequential fuel injector firings employing the feed forward spark advance calibration.

FIG. 6b is an example of actual data taken of the spark advance of a sequentially fuel injected engine operating in the idle drive condition with the feed forward spark advance control system feature active. In FIG. 6b it can be seen that very little RPM feed back spark stabilization is required while a spark advance waveform has been generated that is inversely proportional to the O2CNTR fuel multiplier. Thus, the same degree of engine speed control, as compared to FIG. 5a, is achieved with minimal spark advance corrections from the nominal spark advance.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An improved method of spark advance control for use in a vehicle having an engine with fuel and air mixing means operative in a closed loop made to vary a fuel-to-air ratio by a multiplier which is derived from monitored oxygen content of the engine exhaust, the vehicle further having controller means for monitoring various engine parameters including revolutions per minute (RPM) and means for firing a spark to an appropriate cylinder, the improved method of spark advance control comprising:

(a) calculating a spark advance valve as a function of the various engine parameters;
(b) determining whether the spark advance value should be altered based on the various engine parameters;
(c) whenever the spark advance value should be altered, calculating a first spark advance change value as a function of actual RPM and ideal idle RPM;
(d) whenever the spark advance value should be altered, calculating a second spark advance change value as a function of actual and ideal fuel-to-air ratio multipliers and adding the first and second change values whenever the fuel and air mixing means is operating in the closed loop mode;
(e) whenever the spark advance value should be altered, altering the spark advance value by adding to it the first and, when calculated, the second change values; and
(f) firing a spark to an appropriate engine cylinder in accordance with the spark advance value.

2. The method of claim 1 wherein step (c) further comprises:
calculating the first spark advance change value by substracting a calculated ideal engine idle RPM from the actual engine RPM;
comparing the first change value with a deadband envelope of previously determined change values; and
setting the first change value to zero whenever the calculated first change value is within the deadband envelope.

3. The method of claim 1 wherein step (d) further comprises:
comparing the closed loop fuel system fuel-to-air ratio multiplier with a predetermined deadband envelope of multiplier values and calculating the second spark advance change value as a function of a deviation of the multiplier from an ideal value whenever the multiplier lies within the predetermined deadband envelope of multiplier values.

4. The method of claim 2 wherein step (d) further comprises:
comparing the closed loop fuel system fuel-to-air ratio multiplier with a predetermined deadband envelope of multiplier values and calculating the second spark advance change value as a function of a deviation of the multiplier from an ideal value whenever the multiplier lies within the predetermined deadband envelope of multiplier values.

* * * * *